United States Patent Office 3,164,640
Patented Jan. 5, 1965

3,164,640
PRODUCTION OF p,p'-ISOPROPYLIDENEDI-PHENOL CRYSTALS HAVING LOW PHENOL CONTENT
Logan C. Bostian, William D. Griffin, and Zalik Oser, all of Morris Township, Morris County, N.J., assignors to Allied Chemical Corporation, New York, N.Y., a corporation of New York
No Drawing. Filed May 2, 1961, Ser. No. 107,074
3 Claims. (Cl. 260—619)

This invention relates to the production of p,p'-isopropylidenediphenol crystals having low phenol content.

p,p'-Isopropylidenediphenol (generally known as Bisphenol-A) has become increasingly important in many fields of application. It is particularly valuable as an intermediate in the manufacture of resinous products such as polycarbonates. Polycarbonate resins find utility in lenses, instrument windows, oil sight gauges and transparent appliance parts.

A typical commercial procedure for producing p,p'-isopropylidenediphenol crystals involves reacting phenol, in stoichiometric excess, and acetone at temperature of about 20° to 80° C. in the presence of an acidic condensing agent. Conversion of the phenol and acetone is carried to the point at which a slurry of p,p'-isopropylidenediphenol crystals in liquid medium is formed. The crystals, consisting of a complex of about 70% by weight p,p'-isopropylidenediphenol and about 30% by weight phenol, are recovered from the liquid by centrifuging and are then heated in vacuum to distill phenol from the desired p,p'-isopropylidenediphenol crystals. This distillation step not only is expensive but also tends to favor the formation of undesired impurities.

An object of this invention is to provide a process for producing p,p'-isopropylidenediphenol (hereinafter referred to as Bisphenol-A) crystals having low phenol content. Another object is to provide a process whereby Bisphenol-A crystals having low phenol content are recovered from reaction mixtures produced by reacting phenol and acetone. Still another object is the provision of a continuous process for producing Bisphenol-A crystals having low phenol content. Other objects will be apparent from the following detailed description.

According to this invention, Bisphenol-A crystals having low phenol content are produced by precipitating the crystals from a liquor containing in solution Bisphenol-A and phenol, the weight ratio of Bisphenol-A to phenol in the liquor in equilibrium with the crystals being at least 2.0 to 1, and separating the crystals having low phenol content from the liquor. These crystals contain less than 10% and preferably less than 7% by weight of phenol.

It is essential in precipitation of Bisphenol-A crystals having low phenol content from a liquor containing in solution Bisphenol-A and phenol that the weight ratio of Bisphenol-A to phenol in the liquor in equilibrium with the crystals be at least 2.0 to 1. At ratios just slightly below the minimum weight ratio of 2.0 to 1, the crystals obtained are invariably in the form of the phenol complex and contain about 30% by weight of phenol. As a safety measure, it is preferred that the weight ratio of Bisphenol-A to phenol in the liquor in equilibrium with the crystals be at least 2.1 to 1.

In a specific aspect of this invention, Bisphenol-A crystals having low phenol content are produced by reacting phenol and acetone in the presence of an acidic condensation catalyst under conditions forming a reaction liquor from which Bisphenol-A crystals are precipitated, said liquor containing Bisphenol-A in solution in unreacted phenol, the weight ratio of Bisphenol-A to phenol in the liquor in equilibrium with the crystals being at least 2.0 to 1, and separating the crystals having low phenol content from the liquor. In this aspect of the invention, the Bisphenol-A may be present entirely in solution in unreacted phenol but preferably is present partly as solid crystals in the form of a slurry.

The conditions necessary to obtain a reaction liquor in equilibrium with precipitated Bisphenol-A crystals which contains Bisphenol-A and phenol in the required weight ratio may be readily determined by simple experimentation.

The phenol and acetone are generally employed in amount corresponding to about 2 to 3 and preferably about 2 to 2.5 mols of phenol per mol of acetone. Use of phenol to acetone mol ratio above about 3 to 1 fails to produce a reaction liquor in equilibrium with precipitated Bisphenol-A crystals which contains Bisphenol-A and phenol in the required weight ratio.

The acidic condensation catalyst employed in the reaction of phenol and acetone may be a strong mineral acid such as hydrochloric acid or sulfuric acid, or an acid-acting material such as acetyl chloride, sulfur dioxide, boron trifluoride or acid-activated clays. Use of the catalyst in amount ranging from about 1 to 30% and preferably from about 3 to 8% by weight of the total reactants has been found to be suitable.

The reaction of the phenol and acetone is carried out at temperature which permits formation of a reaction mixture containing Bisphenol-A, at least some of which is in solution in unreacted phenol. This temperature may vary between 40° and 90° C. However, if it is desired that the Bisphenol-A be entirely in solution in unreacted phenol, the temperature finally attained must be at least 70° C. Atmospheric, subatmospheric or superatmospheric pressures may be employed.

The reaction is carried out for a sufficient contact time to produce under the prevailing conditions a reaction mixture containing at least some of the Bisphenol-A in solution in unreacted phenol in the required weight ratio of at least 2.0 to 1. Contact times in the order of about 2 to 20 hours have been found to be ample.

When the reaction mixture comprises a slurry of solid crystals of Bisphenol-A and a liquor containing Bisphenol-A in solution in unreacted phenol, crystals having low phenol content may be directly recovered from the reaction mixture provided that the Bisphenol-A to phenol weight ratio in the liquor in equilibrium with the crystals is at least 2.0 to 1. Similarly, when the reaction mixture comprises a liquor containing the Bisphenol-A entirely in solution in unreacted phenol, crystals having low phenol content may be recovered by precipitating the crystals from the liquor provided that the Bisphenol-A to phenol weight ratio in the liquor in equilibrium with the crystals does not fall below 2.0 to 1 during precipitation thereof.

The Bisphenol-A crystals may be precipitated from the reaction liquor by any suitable procedure, preferably by cooling to temperature of about 40° to 70° C. In order, however, to insure the production of Bisphenol-A crystals of low phenol content the cooling operation must be terminated before the Bisphenol-A to phenol weight ratio in the liquor falls below 2.0 to 1. Thus, in such case, the weight ratio of Bisphenol-A to phenol initially present in the liquor must be substantially in excess of 2.0 to 1.

Bisphenol-A crystals of low phenol content obtained in the form of a slurry or precipitated from reaction liquor may be separated in any suitable way, for example, by filtration, centrifuging and the like, and then dried at temperature of about 40° to 70° C. If desired or required, the separated crystals may be purified, as by conventional recrystallization from a suitable solvent.

In a preferred embodiment of this aspect of the invention, Bisphenol-A crystals having low phenol content are produced in continuous manner by continuously feeding phenol and acetone to a reaction zone where the phenol is reacted with the acetone in the presence of an acidic condensation catalyst under conditions forming a reaction mixture containing Bisphenol-A, at least part of which is in solution in unreacted phenol, continuously withdrawing a portion of the reaction mixture from the reaction zone, recovering Bisphenol-A crystals from the withdrawn reaction mixture, and continuously adding make-up phenol and acetone to the reaction zone. As indicated above, when a slurry of solid Bisphenol-A crystals is formed, and the crystals are directly recovered, the weight ratio of Bisphenol-A to phenol in the liquor in equilibrium with the crystals must be at least 2.0 to 1. When the Bisphenol-A formed is entirely in solution in unreacted phenol, and the crystals are precipitated, the weight ratio of Bisphenol-A to phenol in the liquor in equilibrium with the crystals must not fall below 2.0 to 1 during precipitation thereof.

The following examples in which percentages are by weight illustrate ways in which the principle of this invention has been applied but should not be construed as limiting the invention.

*Example 1*

A mixture consisting of 65% phenol, 20% acetone and 15% concentrated aqueous hydrochloric acid (37%) was charged into a reactor and allowed to react with stirring at temperature of 70° C. After a four hour period, the resulting reaction mixture comprised a solution containing 14% water, 6% hydrogen chloride, 6% acetone, 17% phenol and 57% Bisphenol-A. The Bisphenol-A to phenol ratio in the mixture was 3.3 to 1. The liquor was then cooled to 55° C., and the crystals which precipitated were separated by filtering through a heated filter at 55° C. The filtrate contained Bisphenol-A dissolved in phenol in ratio substantially in excess of 2.0 to 1. The separated Bisphenol-A crystals contained 1.6% phenol.

*Example 2*

A solution containing 15% water, 9% acetone, 19% phenol and 57% Bisphenol-A (Bisphenol-A to phenol ratio of 3.0 to 1) was cooled to 45° C., and the crystals which precipitated were separated by filtering through a heated filter at that temperature. The filtrate contained Bisphenol-A dissolved in phenol in ratio of 2.36 to 1, and the separated crystals contained 6.7% phenol.

If necessary, the phenol content of the Bisphenol-A crystals obtained in Examples 1 and 2 could be readily removed without distillation, for example, by simply washing the crystals with water.

*Example 3*

In an experiment similar to that of Example 2, a solution was prepared containing 15% water, 9% acetone, 25% phenol and 51% Bisphenol-A (Bisphenol-A to phenol ratio of 2.04 to 1). This solution was cooled to 40° C., and the crystals which precipitated were separated by filtering at that temperature. The ratio of Bisphenol-A to phenol in the resulting liquor was 1.93 to 1. The separated crystals contained 29.9% phenol which is approximately the amount existing in the complex of Bisphenol-A and phenol. Thus, precipitation of Bisphenol-A crystals from a liquor containing in solution Bisphenol-A and phenol, the weight ratio of Bisphenol-A to phenol in the liquor in equilibrium with the crystals being only slightly below a ratio of 2.0 to 1, yields the phenol complex rather than Bisphenol-A of low phenol content.

The process of this invention has the distinct advantage of eliminating the expensive and often unsatisfactory distillation procedure employed in present commercial processes for recovering phenol from its complex with Bisphenol-A. Moreover, it enables reduction in the amount of solvent and the number of stages required for purification via recrystallization.

Numerous modifications of the invention will be apparent to those skilled in the art. Hence, the invention is to be deemed as limited only by the scope of the appended claims.

We claim:

1. A continuous process for producing p,p'-isopropylidenediphenol crystals containing less than 10% by weight phenol which comprises continuously introducing a mixture consisting of phenol, acetone and an acidic condensation catalyst into a reaction zone, maintaining said reactants in the reaction zone under conditions forming a reaction mixture containing p,p'-isopropylidenediphenol, at least part of which is in solution in unreacted phenol, continuously withdrawing a portion of the reaction mixture from the reaction zone, recovering p,p'-isopropylidenediphenol crystals containing less than 10% by weight phenol from the withdrawn reaction mixture, the weight ratio of dissolved p,p'-isopropylidenediphenol to phenol in the liquor in equilibrium with the crystals being maintained at at least 2.0 to 1, and continuously adding make-up phenol and acetone to the reaction zone.

2. A continuous process for producing p,p'-isopropylidenediphenol crystals containing less than 10% by weight phenol which comprises continuously introducing a mixture consisting of phenol, acetone and an acidic condensation catalyst into a reaction zone, maintaining said reactants in the reaction zone under conditions forming a reaction liquor containing p,p'-isopropylidenediphenol in solution in unreacted phenol, continuously withdrawing a portion of the reaction liquor from the reaction zone, precipitating p,p'-isopropylidenediphenol crystals from the withdrawn reaction liquor, the weight ratio of dissolved p,p'-isopropylidenediphenol to phenol in the liquor in equilibrium with the crystals being at least 2.0 to 1, separating the crystals containing less than 10% by weight phenol from the liquor, and continuously adding make-up phenol and acetone to the reaction zone.

3. A continuous process for producing p,p'-isopropylidenediphenol crystals containing less than 10% by weight phenol which comprises continuously introducing a mixture consisting of phenol, acetone and an acidic condensation catalyst into a reaction zone, maintaining said reactants in the reaction zone under conditions forming a reaction mixture comprising a slurry of solid p,p'-isopropylidenediphenol crystals and a liquid in equilibrium with the p,p'-isopropylidenediphenol crystals containing p,p'-isopropylidenediphenol in solution in unreacted phenol in the weight ratio of at least 2.0 to 1, continuously withdrawing a portion of the reaction mixture from the reaction zone, separating said crystals containing less than 10% by weight phenol from the withdrawn reaction mixture, and continuously adding make-up phenol and acetone to the reaction zone.

References Cited in the file of this patent

UNITED STATES PATENTS

| | | |
|---|---|---|
| 1,977,627 | Greenhalgh | Oct. 23, 1934 |
| 1,978,949 | Kohn et al. | Oct. 30, 1934 |
| 2,762,846 | Reiner et al. | Sept. 11, 1956 |
| 2,792,429 | Whelan | May 14, 1957 |